United States Patent [19]

Reynolds

[11] Patent Number: 5,467,736
[45] Date of Patent: Nov. 21, 1995

[54] WILD SQUIRREL FEEDER

[76] Inventor: Robert R. Reynolds, 811 Heard Ave., Maybrook, N.Y. 12543

[21] Appl. No.: 269,354
[22] Filed: Jun. 29, 1994
[51] Int. Cl.⁶ ................................................ A01K 39/01
[52] U.S. Cl. ............................................................ 119/52.2
[58] Field of Search .......................... 119/54, 56.1, 52.2

[56] References Cited

U.S. PATENT DOCUMENTS

| 849,169 | 4/1907 | Stein | 119/56.1 X |
| 3,638,617 | 2/1972 | White | 119/54 X |
| 4,771,735 | 9/1988 | Larsen | 119/62 |
| 4,823,738 | 4/1989 | Gold | 119/370 |
| 5,255,631 | 10/1993 | Anderson | 119/52.2 |

FOREIGN PATENT DOCUMENTS 8807325  10/1988  WIPO ........................................ 119/54

Primary Examiner—Gene Mancene
Assistant Examiner—Thomas Price

[57] ABSTRACT

A wild animal feed dispensing machine capable of providing hours of entertainment for individuals who enjoy watching wild life eat specifically designed for wild squirrels, whose intelligence allows them to figure out the mechanism within a reasonable length of time and remember for future feeding. The machine is comprised of six major parts: (1) feed storage container; (2) rotating valve; (3) different colored spokes; (4) gnaw guard; (5) trough/perch catch basin and (6) holding bracket The feed storage container with lid, stores the feed. The rotating valve holds the feed in the storage area until the different colored spokes rotate, which in turn rotate the valve, allowing feed to fall by gravity into the trough/perch catch basin. The gnaw guard keeps the wild squirrels from gnawing at the rotating valve and damaging it. The holding bracket holds the feeder upright. Since wild squirrels have a very keen sense of smell they are able to locate the feed in the feeder. Their curiosity and appetite then takes over and they will investigate. They climb all over the feeder, stumbling onto the different colored spokes, making them rotate by their weight. Feed then falls in to the trough/perch catch basin. From that time on, their intelligence tells them that all they have to do is to sit on the trough/perch catch basin and turn the different colored spoked wheel in either direction to receive feed. Wild squirrels do not like to share their food with other wild squirrels. It is amusing to watch squirrels chasing each other away from the feeder. The feeder can accommodate two wild squirrels at one time.

3 Claims, 6 Drawing Sheets

RED

YELLOW

BLUE

GREEN

WILD SQUIRREL FEEDER

FIELD OF THE INVENTION

The present invention generally relates to wildlife feeder, specifically designed for wild squirrels.

BACKGROUND OF THE INVENTION

There are many wild bird feeders on the market, which provide considerable enjoyment to individuals, who can spend time observing the birds as they come to feed. Some feeders have been specifically designed to prevent squirrels from gaining access to the feed. Some feeders have been specifically designed to provide some sort of exhibition of the natural behavior of the wild birds as they feed.

There have also been some domestic animal self-feeding systems. These were specifically designed to provide a domesticated animal (house pet or livestock) with access to feed when there are no human attendants to dispense the feed. This required that the animal had to have some sort of training to operate the machine.

OBJECTS AND ADVANTAGES

Accordingly, several objects and advantages of the present invention are that it is specifically designed to provide visual entertainment to individuals who observe the intelligence of wild squirrels, as they are required to turn the different colored spokes in order to receive a nourishing reward.

Like all rodents, a squirrel's front teeth will continue growing throughout their lifetime. In order to keep their teeth worn down, squirrels must gnaw on hard objects. (It is well known by power company employees that squirrels gnaw on power lines, causing power outages.) Squirrels' teeth and jaws are very strong so that they can open the shells of nuts such as black walnuts and hickory nuts, which are some of their natural foods.

Because of the squirrels' natural gnawing behavior, a gnaw guard has been designed to keep the squirrels from damaging the dispensing mechanism to gain unlimited access to the feed storage area. This gnaw guard had to be strategically placed so that the squirrels are not able to get their teeth into position to gnaw on the mechanisms. This gnaw guard had to be made of a material that the squirrels could not penetrate with their sharp teeth. The gnaw guard is drawn tightly together with a screw.

The gnaw guard has two additional functions: first, it acts to attach the trough/perch catch basin to the feeder and second, it allows the unit to be taken apart for easy packaging. The most important function of the gnaw guard is for the longevity of the squirrel feeder. Without this gnaw guard the squirrels would chew up the mechanism in no time, making the device totally inoperative.

The trough/perch catch basin has been angled to provide drainage of feed and shells, especially during inclement weather and prevent rotting of feed and debris on the feeder trough/perch catch basin. The angling of the trough/perch catch basin further encourages the acrobatic abilities of the squirrels, as they hang, climb, swing, balance, fight and play with one another on the trough/perch catch basin, during feeding.

Also, it should be noted that squirrels are color-blind. They only see black and white and shades thereof, but the spokes of the feeder are covered with four different colors of weather sheathing. This is done for the enjoyment of the individuals who are being entertained by the feeding behaviors of the squirrels.

Providing separate feeding facilities for the squirrels can decrease the invasion and damage done to bird feeders by squirrels and can also provide hours of entertainment as the squirrels are much more active and acrobatic as they manipulate the different color spokes and eat the feed than birds are.

Other feed dispensing machines have been invented for feeding domesticated animals. They all require some sort of training for the domesticated animal so that they can use the machine. But wild squirrels do not have to be trained. Their very keen sense of smell tells them that there is feed in the feed storage container. They then climb all around the feeder trying to gain access to the feed and eventually climb on the different colored spokes, which turn from their weight. When the different colored spoke are turned, feed falls into the trough/perch catch basin. After the squirrels see this, they are intelligent enough to realize that all they have to do is to sit on the trough/perch catch basin and turn the different colored spokes to satisfy their insatiable appetite. Once one wild squirrel learns this, the rest learn by observation.

DRAWING FIGURES

Figure 1:
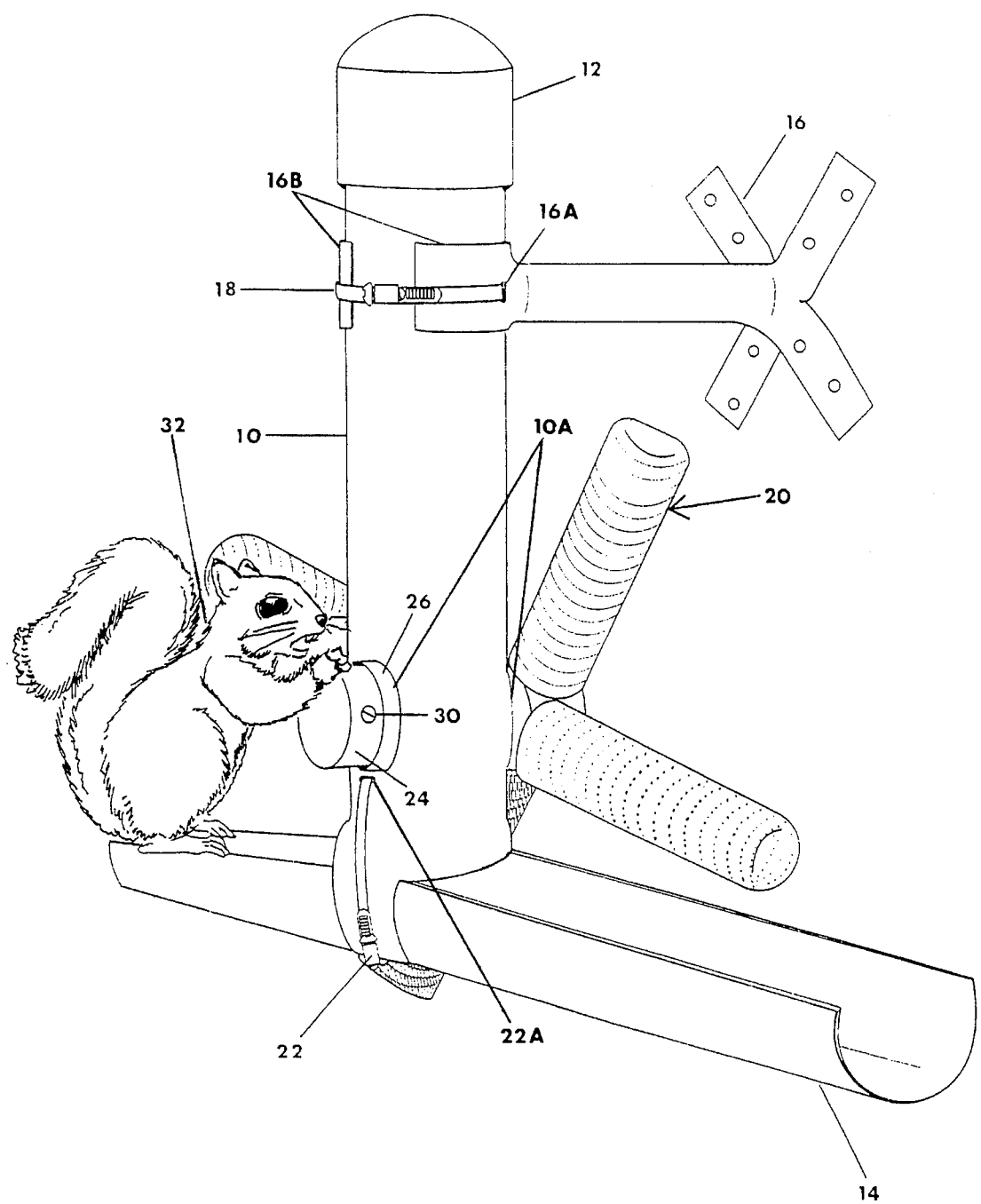
FIG. 1 is a perspective view of my invention.
Figure 2:
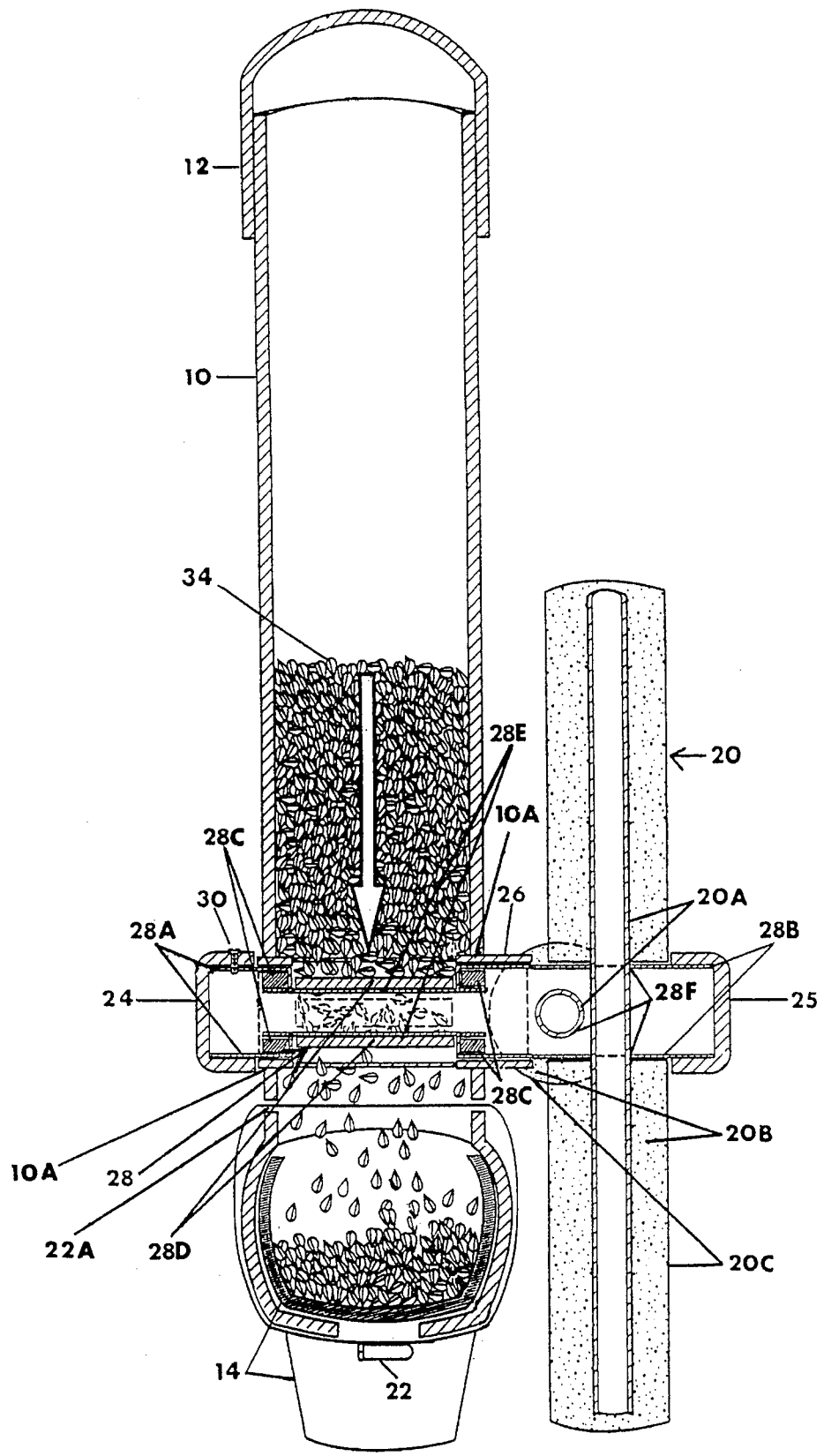
FIG. 2 is a cross section view of my invention.

| REFERENCE NUMERAL IN DRAWINGS | |
| --- | --- |
| PART NAME | FOUND ON FIG. NUMBER |
| 10 Feed storage container | 1-2-3-4 |
| 10A Valve sleeve opposing cutouts | 1-2-3 |
| 10B Opposing cutouts in the feed storage container | 3 |
| 12 Cap lid | 1-2-3 |
| 14 Trough/perch catch basin | 1-2-3 |
| 16 Holding bracket | 1-3 |
| 16A Opposing holes for holding bracket | 1-3 |
| 16B Grasping band | 1-3 |
| 18 Holding bracket clamp | 1-3 |
| 20 Different colored spokes | 1-2-3-4 |
| 20A Spoke core | 2-3 |
| 20B Foam spoke padding | 2-3 |
| 20C Four different colored weather sheathing | 2-3 |
| 22 Gnaw guard | 1-2-3 |
| 22A Opposing holes for gnaw guard | 1-2-3 |
| 24 Valve end cap | 1-2-3 |
| 26 Valve sleeve | 1-2-3-4 |
| 26A Feed inlet | 3-4 |
| 26B Feed outlet | 3-4 |
| 28 Horizontal cylindrical symmetrical rotating valve | 2-3-4 |
| 28A End cap end journal | 2-3 |
| 28B Spoke end journal | 2-3 |
| 28C Bushings for journals and valve base | 2-3 |
| 28D Veins for horizontal cylindrical symmetrical rotating valve | 2-3-4-6 |
| 28E Valve base | 2-3-4-6 |
| 28F Opposing holes for spoke core | 2-3 |
| 28G Opposing saw slot cuts | 3-6 |
| 28H Lengthwise slots in bushings | 3 |
| 30 Valve end cap holding screw | 1-2-3 |
| 32 Wild squirrel | 1 |
| 34 Feed | 2-4 |

DESCRIPTION—FIGS. 1–6

Figure 3:
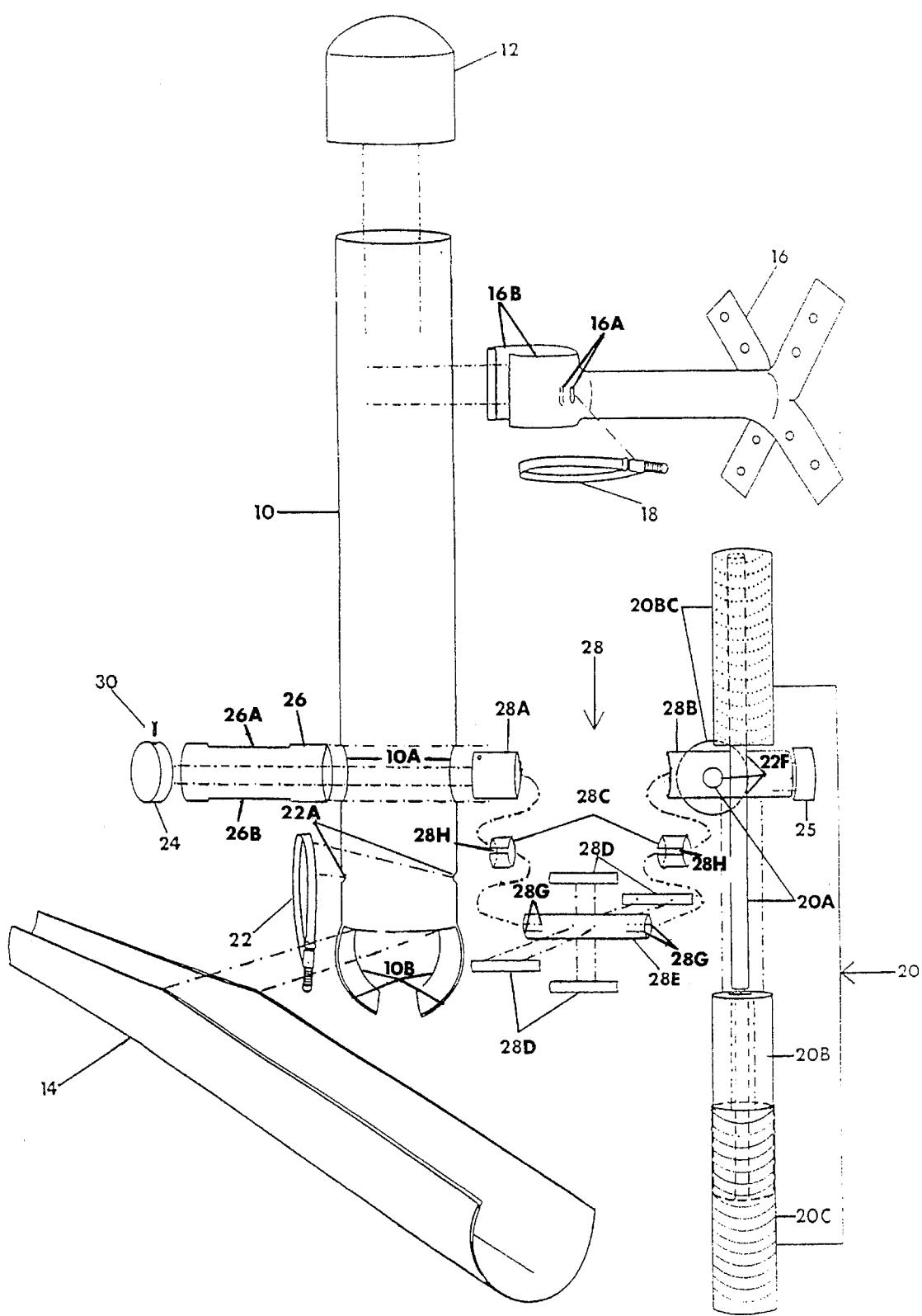
FIG. 3 is an exploded view of my invention.

A typical embodiment of the present invention is illustrated in FIG. 1 (front view) and FIG. 3 (an exploded view).

In FIG. 1 a feed storage container (10) is a vertical cylinder made of a weatherproof material (3 inch diameter PVC pipe). A cap lid (12), of similar weatherproof material, is loosely fitted to cover the upper end to keep feed fresh. A wild squirrel (32) is shown consuming feed.

A trough/perch catch basin (14) is a horizontal semi-circular length of 3 inch diameter PVC pipe. It is angled bilaterally downward from its center. A trough/perch catch basin passes through two opposing cutouts (10B) at the base of the feed storage container. The trough/perch catch basin is secured to the base of the feed storage container by a gnaw guard (22).

A gnaw guard is constructed of a stainless steel hose clamp. The clamp encircles the trough/perch catch basin at its center and passes through two opposing holes (22A) in the feed storage container. These holes are aligned just below the cutouts (10A) for valve sleeve (26). The gnaw guard is tightened and secured by its screw.

The holding bracket (16) is attached to the upper portion of feed storage container. The holding bracket can be attached to a vertical surface to support the feeder. The holding bracket consists of a horizontal length of 1½ inch diameter PVC pipe. It has been cut and formed at the proximal end. This creates a grasping band around the feed storage container.

The bracket clamp (18) cinctures the holding bracket to the feed storage container. The bracket clamp is a stainless steel hose clamp. It passes through two opposing holes (16A) just behind the grasping band (16B) of the holding bracket (16) and around the feed storage container, half way between the upper spokes and the bottom of the cap lid. The bracket clamp is tightened and secured by its screw.

The distaff end of the holding bracket has four equally spaced arms. The arms have been created by four lengthwise cuts in the holding bracket. Each arm is bent back at a 90 degree angle to the shaft of the holding bracket. Fasteners can be driven through pre-drilled holes in the arms to support the feeder.

A holding bracket is not restricted to any material, however the weatherproof qualities of PVC make it an ideal material for the longevity of the feeder. The holding bracket can, in fact, be eliminated altogether if the feeder is to be supported by other means.

A valve end cap (24) holds a horizontal, cylindrical, symmetrical, rotating valve (28) (Not shown in FIG. 1) in a valve sleeve (26). The valve cap is secured by a valve end cap holding screw (30).

A valve sleeve (26) is a length of 2 inch diameter PVC pipe which passes horizontally through two opposing cutouts (10A) in the feed storage container. One end of the valve sleeve extends beyond the feed storage container only enough to prevent rubbing of the valve end cap against the feed storage container. The other end of the valve sleeve extends beyond the feed storage container enough to allow clearance for the different colored spokes (20) to turn. The valve sleeve is secured to the feed storage container by adhesive.

The portion of the valve sleeve inside the feed storage container has two opposing cutouts on the top and on the bottom of the inside portion of a valve sleeve. This forms the feed inlet (26A) and the feed outlet (26B). The cutouts extend from wall to wall inside the feed storage container.

Figure 4:
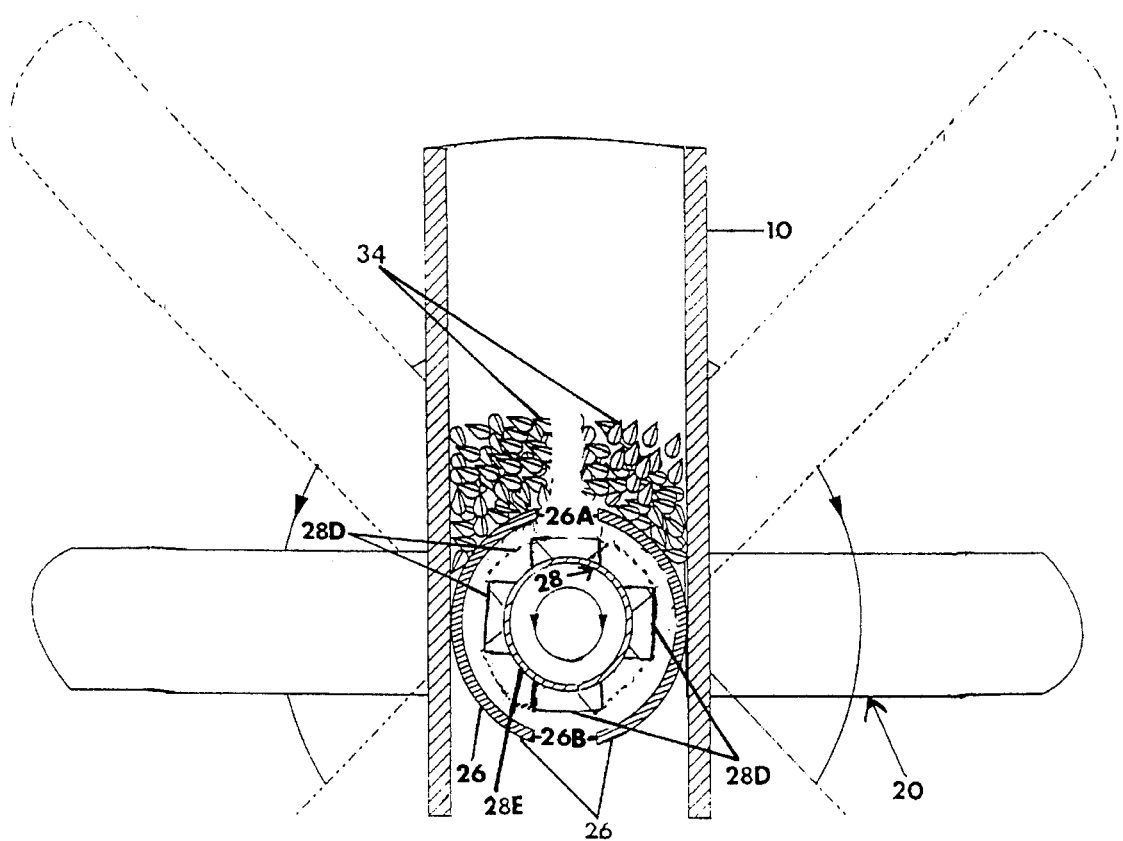
FIG. 4 is a cross section of the horizontal, cylindrical, symmetrical, rotating valve in my invention.
Figure 5:
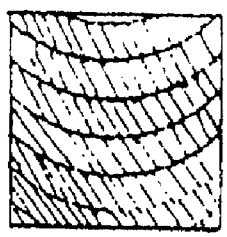
FIG. 5 is a legend for color shadings
Figure 5:
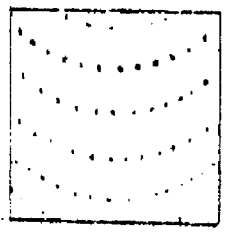
Figure 5:
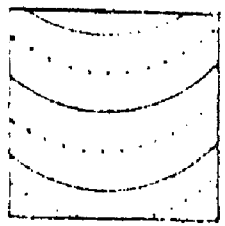
Figure 5:
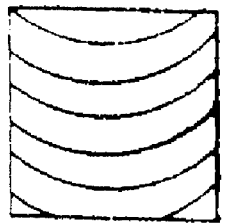

In FIGS. 2, 3, 4 and 6 other embodiments of the present invention are shown with specific attention to a horizontal, cylindrical, symmetrical rotating valve (28) and different colored spokes (20). The horizontal, cylindrical, symmetrical rotating valve (hereinafter referred to as valve) is comprised of nine parts which have been assembled to slip fit through the valve sleeve. The valve base (28E) is comprised of 1 inch diameter PVC pipe with opposing saw slots cut lengthwise at each end (28G) to allow it to be pressed into journal bushings (28C). The four veins for the valve (28D) are strips of PVC pipe cut from 1 inch diameter PVC pipe. They are evenly spaced, lengthwise, on top of valve base (28E). The veins are attached by adhesive. Journal bushings (28C) are short lengths of 1¼ inch diameter PVC pipe with lengthwise slot cutouts (28H) to allow them to be compressed and slide into journals (28A and 28B). (28B) is a spoke end journal of appropriate length of 1½ inch diameter PVC pipe. (28A) is the end cap journal of appropriate length of 1½ inch diameter PVC pipe. (28F) are opposing holes to accept spoke core (20A). The valve extends beyond the valve sleeve on one end to accept a valve end cap (24). The valve extends beyond the sleeve on the other end to accept the spoke core. FIG. 4 shows a front view cross-section with alternating positions of the valve that is between the inlet and outlet of the valve sleeve which has longitudinal symmetrical grooves between the veins to accept feed (34). The grooves between the veins hold the feed and when the valve is rotated the feed travels from the top inlet position to the bottom outlet position and drops through the bottom outlet into the trough/perch catch basin. The valve can be rotated either clockwise or counterclockwise.

In FIG. 3 the portion of the valve that extends (28F) past the sleeve to accept the spoke core has two opposing holes to accept one length of the spoke core centered to create two spokes. Another length of the spoke core is inserted through another two opposing holes (28F) perpendicular to the first set and offset to allow the lengths of the spoke core to pass each other.

FIG. 3 shows an embodiment of the spoke core (20A) as equal lengths of ½ inch diameter PVC pipe. Foam spoke padding (20B) is attached with adhesive onto the spoke core and then covered with four different colored weather sheeting (20C). Foam spoke padding is applied for bulk so that the wild squirrel will feel more comfortable climbing. A spoke end cap (25) identical to valve end cap (24) is attached with adhesive to the spoke end of the valve for aesthetics.

Figure 6:
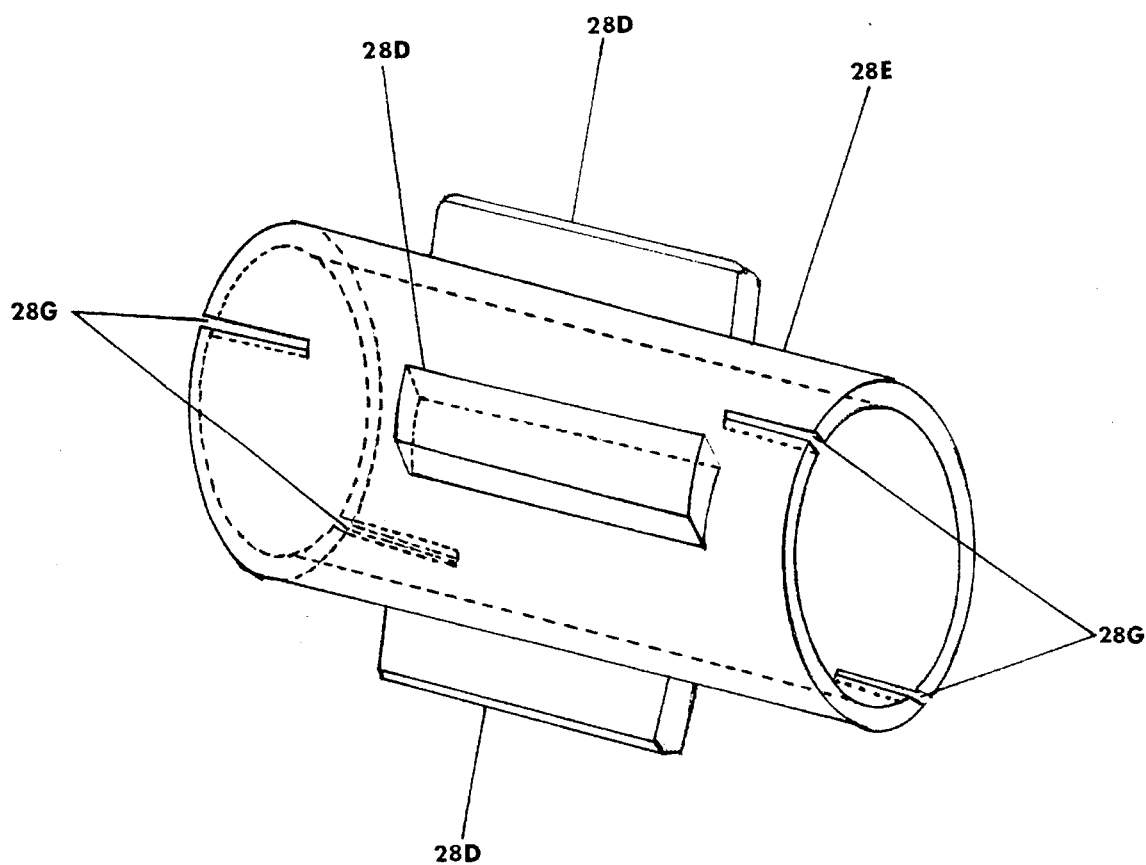
FIG. 6 is an elliptical view of valve veins and valve base

FIG. 6 shows a cross-section of the valve base and valve veins with opposing saw cuts and an elliptical view of valve veins and valve base with opposing saw cuts.

I claim:

1. A wild animal feed dispensing machine comprising:
   a. vertical feed storage container having a base, and a lid is fitted atop said feed storage container,
   b. a horizontal semi-circular trough and perch feed catch basin centered and attached to said base,
   c. a horizontal cylindrical symmetrical rotating valve slip fitted through a sleeve in said feed storage container just above said trough and perch catch basin,
   d. a spoked wheel of different colored spokes rotatably attached perpendicularly to said horizontal cylindrical symmetrical rotating valve at one end,
   e. a cap attached to said rotating valve at an opposite end from said spoked wheel, and
   g. a holding bracket of suitable material supporting the weight of said wild animal feeder and attached to said feed storage container.

2. A wild animal feed dispensing machine of claim 1 wherein a metal gnaw guard passes through two holes in a center of said feed storage container under said rotating valve and parallel to said rotating valve.

3. A wild animal feed dispensing machine of claim 1 wherein the semi-circular trough and perch catch basin is sloped downwards from a center bilaterally allowing feeding of one or more wild animals at a time.

\* \* \* \* \*